Oct. 24, 1961  W. WYSOCKI  3,005,969
POSITION TRANSDUCER ADAPTED TO TRANSDUCE THE DISPLACEMENT
OF A MECHANICAL MEMBER INTO AN ALTERNATE VOLTAGE
Filed June 24, 1958  2 Sheets-Sheet 1
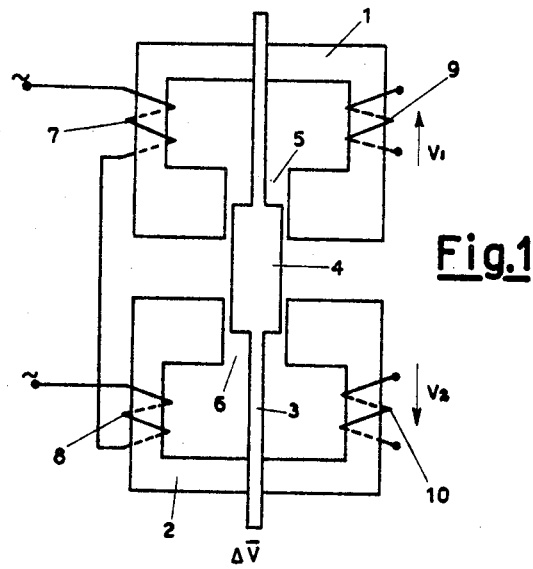
Fig.1
Fig.2
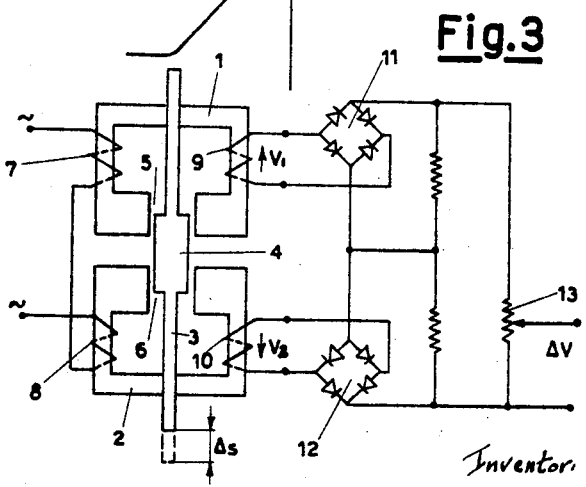
Fig.3
Inventor:
Waclaw Wysocki
By: B. Schlesinger
Attorney Oct. 24, 1961  W. WYSOCKI  3,005,969
POSITION TRANSDUCER ADAPTED TO TRANSDUCE THE DISPLACEMENT
OF A MECHANICAL MEMBER INTO AN ALTERNATE VOLTAGE
Filed June 24, 1958  2 Sheets-Sheet 2

Inventor:
Waclaw Wysocki
By: [signature]
Attorney

United States Patent Office 3,005,969
Patented Oct. 24, 1961

3,005,969
POSITION TRANSDUCER ADAPTED TO TRANSDUCE THE DISPLACEMENT OF A MECHANICAL MEMBER INTO AN ALTERNATE VOLTAGE
Waclaw Wysocki, Milan, Italy, assignor to Construzioni Meccaniche Riva S.p.A., Milan, Italy, a company of Italy
Filed June 24, 1958, Ser. No. 744,200
Claims priority, application Italy July 6, 1957
5 Claims. (Cl. 336—134)

The invention relates to a device adapted to transduce the displacement of a mechanical member from a predetermined position into an alternate voltage, the amplitude of which is proportional to the magnitude of the displacement and the phase of which changes by 180 electric degrees in accordance with the direction of displacement of said mechanical member from the predetermined position of equilibrium.

There are known other devices which perform the same task and which are sensitive to the magnitude and to the direction of the displacement; however, those devices generally involve inconveniences or limitations if at the same time a rapid response is required, if the components are not to be subjected to wear or to require periodical replacement, and if at the same time the electric signal delivered by the device is to have a comparatively elevated power.

Conventional transducers, employing resistance bridges, comprise, for instance, a resistor with a sliding contact, that moves during operation and that, consequently, is subject to wear and possibly to oxidation of the contact if it is used in moist or otherwise corrosive atmosphere, especially if the devices are destined to remain still for long durations of time.

There are also known transducers which comprise inductors that vary their inductance as a function of the position of the magnetic cores inserted thereinto. These do not have the disadvantages described above, but in practice, if of industrially convenient size, they can deliver but a signal of comparatively small power. Hence in the cases in which a higher power of the signal is required, they require the use of an electronic amplifier, which involves the use of electron tubes which have to be replaced periodically and are easily damaged.

There are also position transducers which are of sturdy construction and which can deliver, at the same time, a signal of sufficient power, but these require either a considerable mechanical power to be actuated or have only slow response.

It is an object of the present invention to provide a position transducer which may find use in critical conditions of operation, where other similar devices would show inconvenience or limitations: that is to say, if there are, required contemporaneously a rapid response, a comparatively elevated outlet power and if at the same time it is necessary to ensure maximum safety of operation without maintenance, servicing and periodical replacement of component parts. The application of said transducer, however, is not limited to the cases of critical conditions only, since it is very simple and not burdensome in construction.

The instant transducer is essentially characterized in that it comprises two fixed magnetic cores provided with air gaps, a mobile magnetic core adapted to be inserted more or less into said air gaps in such a way that if it shifts, it simultaneously increases the magnitude of one air gap and decreases the magnitude of the other. The transducer further comprises two primary coils which are energized by alternating current and two secondary coils placed on the sections of the fixed magnetic cores other than those occupied by the primary coils, in such a way that the electromotive forces induced in the secondaries vary according to the position of the mobile core and the difference of said electromotive forces is a function of the position of the mobile core.

The transducer according to the invention does not contain any sliding electric contact or other member subject to being replaced periodically, it can deliver a comparatively high power, and the effort required to displace the mobile core is small.

The invention will be better understood from the following description of a practical embodiment thereof, given merely by way of example and illustrated in the accompanying drawings wherein:

FIG. 1 is a diagram showing the principle of the transducer of the invention;

FIG. 2 shows the course of the curve indicating the difference of the electromotive forces induced in the secondaries as a function of the displacement of the mobile magnetic core;

FIG. 3 is a diagram illustrating the transducer of FIG. 1 as connected to a utilizing circuit.

Figure 4:
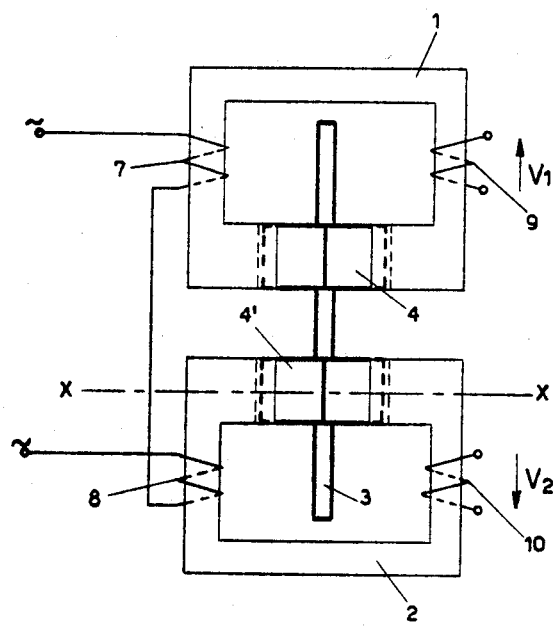
FIGURES 4 and 5 represent a variant in which the transducer is controlled by an angular displacement in lieu of by a translatory displacement as in the preceding case.

As visible in FIG. 1, the transducer according to the present invention comprises essentially two identical fixed magnetic cores 1 and 2 provided with air gaps 5 and 6, a mobile magnetic core 4 guided by a rod 3 in such a way as to be able to move by translatory movement along the longitudinal axis, two equal primary coils 7 and 8 fed by alternating current and connected in series and finally two secondary coils 9 and 10 which too are equal to each other.

The mobile magnetic core 4 is connected through the rod 3 with a mechanical member (not represented in the figure) of which the displacement is to be recorded. The position of said core determines the air gaps of the fixed cores 1 and 2.

The primary coils 7 and 8 are fed by an external source of constant alternating voltage and are series-connected. In that way, the magnetizing current remains constant in practice while the position of the mobile core 4 varies: in fact, while the reluctance of one magnetic circuit increases, it diminishes at the same time in the other circuit, hence the total impedance of the two primaries remains substantially constant within the limits of operation.

The magnetic flux generated by the current in the primaries flows only in part through the fixed magnetic cores, and links with the respective secondaries, while the remaining part constitutes the stray flux and the ratio between the linked fluxes and the stray fluxes depends on the magnitude of the air gap of the respective cores.

In the central equilibrium position, when the mobile core penetrates to an equal extent into the two air gaps, the two magnetic circuits find themselves in the same condition, hence the fluxes linked with the two secondaries are equal, and consequently, the electromotive forces $V_1$ and $V_2$ induced in those coils are of equal amplitude. From the secondaries is to be taken the difference of the induced voltage $\Delta V = V_1 - V_2$, which in this case is nil, by connecting for instance the two secondaries in series and in opposition.

For any other position of the mobile core the fluxes linked with the two secondaries are not equal to each other and to every displacement $\Delta s$ of the mobile core from the central position of equilibrium, there corresponds an increase of the flux linked with one secondary and a diminution of the flux linked with the other secondary, both equal in absolute magnitude and proportional to the magnitude of the displacement $\Delta s$. Consequently the difference of the induced electromotive forces $\Delta V = V_1 - V_2$ is proportional in absolute magnitude to the displacement $\Delta s$ of the mobile core. Obviously the sign of $\Delta V$ may assume a positive or negative value according to the direction of displacement, changing the phase by 180 electric degrees. Hence the consequence is that the transducer generates a signal proportional in absolute magnitude to the displacement of the mechanical member and in sign relative to the direction of said displacement. The course of the characteristic $\Delta V = f(\Delta s)$, taken from an embodiment of the transducer in practice, is indicated in FIG. 2. In this case the characteristic is linear within the limits of operation, but it is obvious that it might have a different course according to the requirements of application, without departing from the scope of the present invention.

The difference of the induced electromotive forces $\Delta = V_1 - V_2$ may be obtained not only at the outlet terminals of the two secondaries connected in series and in opposition, as mentioned above, but also by taking separately the two voltages $V_1$ and $V_2$ and finding then the difference in a suitable auxiliary circuit. An example of this latter case is illustrated in FIG. 3 which shows again the same device of FIG. 1 as connected to a circuit of utilisation of a kind known per se. As is visible in the figure, the coils 9 and 10 are connected respectively to two groups of rectifiers 11 and 12 which deliver through resistors and through the potentiometer 13 a pulsating direct voltage $\Delta V$ of amplitude proportional to the displacement of the mobile core 3 from the central position and of sign relative to the direction of said displacement.

The behaviour under load, for a given position of the mobile core, is very similar to that of a common transformer with great stray flux, which is understood from mere inspection of the circuits while remembering the fact that the magnetizing current of the whole is substantially constant. Hence also the power that can be taken from the transducer is comparatively high and comparable to that obtainable from the above mentioned transformer.

The description of the invention has been given hereinbefore with reference to one possible embodiment in practice thereof, in which the mobile core performs translatory displacements; however the transducer can and may be made also with a mobile core that performs angular displacements, merely by modifying the shape of the mobile core and if needed also the shape of the pole shoes of the fixed cores, without departing from the scope of the invention by any means.

Figure 5:
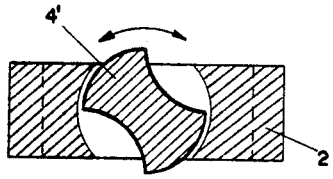

A variant of the embodiment in practice, in which the mobile core performs angular displacements, is indicated diagrammatically in FIGURES 4 and 5, respectively in view and in cross-section taken along the line X—X of FIG. 4, which shows the shape of the core. In FIG. 4 it is seen that the mobile core is composed of two separated members 4, 4', connected rigidly to each other by the control rod 3, but it might be constituted even by one single core if this were required by particular constructive needs, without changing thereby the principle of operation; the mobile core of the first example as well might be constituted by two separate members connected rigidly with each other. The remaining parts of the transducer which have been indicated by the same reference numerals as in FIG. 1, have the same task as in the first example of embodiment described hereinbefore. Hence it is superfluous to repeat their operation here.

The invention hereinbefore described has been explained in principle with reference to the diagrammatical representation of an embodiment thereof in practice and of a variant thereof. It is understood, however, that this has no limiting significance and that numerous constructive variants are possible without departing from the scope of the present invention.

I claim:

1. A position transducer, comprising two fixed generally C-shaped magnetic cores, each of said cores having its opposed ends spaced from each other, one of said cores being inverted with reference to the other, said cores being spaced from one another and having the spaces between their opposed ends aligned, a primary coil wound around one arm of each of said fixed magnetic cores, said primary coils being connected in series and connected to a source of alternating current, a secondary coil wound around another arm of each of said fixed magnetic cores, and a third magnetic core movably mounted in said aligned spaces to vary the magnitude of the air gaps between the opposed ends of the two fixed cores upon movement of said third core therein, whereby to induce in said secondary coils a voltage the magnitude of which varies in accordance with the position of said third core, the difference between the induced voltages in the secondary coils varying in accordance with the position of the movable core in said spaces.

2. A position transducer, comprising two fixed generally C-shaped magnetic cores, each of said cores having its opposed ends spaced from each other to form an air gap therebetween, one of said cores being inverted with reference to the other, said cores being spaced from one another and having said air gaps aligned, a primary coil wound around one arm of each of said fixed magnetic cores, said primary coils being electrically connected in series and connected to a source of alternating current, a secondary coil wound around another arm of each of said fixed magnetic cores, a third magnetic core movably mounted in said aligned air gaps, said third core varying in width in the direction of its movement, whereby to vary the magnitude of said air gaps upon movement of said third core therein and to induce in said secondary coils a voltage the magnitude of which varies in accordance with the position of said third core, the difference between the induced voltages in the secondary coils varying in accordance with the position of the movable core in said air gaps.

3. A position transducer according to claim 2 wherein said secondary coils are electrically connected together so that the voltage induced in one thereof is in opposition to that induced in the other.

4. A position transducer, comprising two fixed generally C-shaped magnetic cores, each of said cores having its opposed ends spaced from each other to form an air gap therebetween, one of said cores being inverted with reference to the other, said cores being spaced from one another and having said air gaps aligned, a primary coil wound around one arm of each of said fixed magnetic cores, said primary coils being electrically connected in series and connected to a source of alternating current, a secondary coil wound around another arm of each of said fixed magnetic cores, and a third magnetic core mounted in said air gaps to move rectilinearly longitudinally, said core being of varying shape in cross section lengthwise to vary the volume of said air gaps in opposite directions whereby to induce in said secondary coils a voltage the magnitude of which varies in accordance with the position of said third core, the difference between the induced voltages in the secondary coils varying in accordance with the position of the movable core in said air gaps.

5. A position transducer, comprising two fixed generally C-shaped magnetic cores, each of said cores having its opposed ends spaced from each other to form an air gap therebetween, one of said cores being inverted with reference to the other, said cores being spaced from one another, and having said air gaps aligned, a primary coil wound around one arm of each of said fixed magnetic cores, said primary coils being electrically connected in series and connected to a source of alternating current, a secondary coil wound around another arm of each of said fixed magnetic cores, a third magnetic core rotatably mounted in said air gaps, said core being of varying radial width to vary the amplitude of each air gap in opposite directions upon rotation therein, whereby to induce in said secondary coils a voltage the magnitude of which varies in accordance with the position of said third core, the difference between the induced voltages in the secondary coils varying in accordance with the position of the movable core in said air gaps.

References Cited in the file of this patent

UNITED STATES PATENTS

| | | |
|---|---|---|
| 2,430,757 | Conrad | Nov. 11, 1947 |
| 2,488,734 | Mueller | Nov. 22, 1949 |
| 2,499,665 | Mestas | Mar. 7, 1950 |
| 2,662,301 | Beach | Dec. 15, 1953 |
| 2,692,357 | Nilson | Oct. 19, 1954 |
| 2,727,705 | Rasmussen | Dec. 20, 1955 |